(12) United States Patent
Punzalan et al.

(10) Patent No.: US 10,902,383 B2
(45) Date of Patent: Jan. 26, 2021

(54) VISION AR: SMARTHR OVERLAY

(71) Applicant: ADP, LLC, Roseland, NJ (US)

(72) Inventors: Roel Punzalan, Pasadena, CA (US); Ignacio Andrade, Pasadena, CA (US)

(73) Assignee: ADP, LLC, Roseland, NJ (US)

( * ) Notice: Subject to any disclaimer, the term of this patent is extended or adjusted under 35 U.S.C. 154(b) by 328 days.

(21) Appl. No.: 15/993,370

(22) Filed: May 30, 2018

(65) Prior Publication Data
US 2019/0370750 A1  Dec. 5, 2019

(51) Int. Cl.
*G06Q 10/00* (2012.01)
*G06Q 10/10* (2012.01)
*G06K 9/00* (2006.01)
*G06F 16/23* (2019.01)

(52) U.S. Cl.
CPC ....... *G06Q 10/105* (2013.01); *G06F 16/2365* (2019.01); *G06K 9/00288* (2013.01); *G06K 9/00469* (2013.01); *G06K 9/00671* (2013.01); *G06K 2209/01* (2013.01)

(58) Field of Classification Search
CPC .............. G06Q 10/105; G06F 16/2365; G06K 9/00288; G06K 9/00671; G06K 9/00469; G06K 2209/01
See application file for complete search history.

(56) References Cited

U.S. PATENT DOCUMENTS

| | | | | |
|---|---|---|---|---|
| 7,229,013 B2* | 6/2007 | Ben-Aissa | ......... | G06K 9/00087 235/380 |
| 9,064,285 B1* | 6/2015 | Nathoo | .............. | G06Q 10/1053 |
| 9,767,585 B1* | 9/2017 | Carter, Jr. | ............... | G06T 11/60 |
| 10,229,100 B1* | 3/2019 | Lesner | ..................... | G06T 11/00 |
| 2014/0111542 A1* | 4/2014 | Wan | ..................... | G06K 9/3258 345/633 |
| 2014/0164772 A1* | 6/2014 | Forte | ........................ | H04L 9/08 713/171 |
| 2015/0254902 A1* | 9/2015 | Macia | .................... | G06Q 30/02 345/633 |
| 2015/0339453 A1* | 11/2015 | Richards | ................ | G16H 80/00 345/633 |
| 2016/0049010 A1* | 2/2016 | Hinski | .................. | G06T 19/006 345/633 |
| 2018/0150810 A1* | 5/2018 | Lee | ......................... | G06T 11/60 |
| 2018/0159838 A1* | 6/2018 | Dintenfass | ............ | H04W 12/06 |

OTHER PUBLICATIONS

Jonathan J. Hull, Berna Erol, Jamey Graham, Qifa Ke, Hidenobu Kishi, Jorge Moraleda, Daniel G. Van Olst. "Paper-Based Augmented Reality". Ricoh Innovations, Inc., California Research Center, Menlo Park, CA, USA, 17th International Conference on Artificial Reality and Telexistence 2007.*

* cited by examiner

*Primary Examiner* — Gabrielle A McCormick
(74) *Attorney, Agent, or Firm* — Yee & Associates, P.C.

(57) ABSTRACT

A method, apparatus, system, and computer program product for retrieving and displaying human resources (HR) information. A computer system identifies an employee in a live view on a mobile display system according to biometric data and identifies HR information associated with the employee using the biometric data and a policy. The HR information is stored in at least one database, and the policy defines the HR information associated with the employee. The computer system displays the HR information associated with the employee in augmented reality information on the live view on the mobile display system.

20 Claims, 9 Drawing Sheets

VISION AR: SMARTHR OVERLAY

BACKGROUND INFORMATION

1. Field

The present disclosure relates generally to managing human resources information and, in particular, to a method, an apparatus, a system, and a computer program product for managing human resources information using an augmented reality system.

2. Background

Company human resources information is typically distributed across multiple databases. Information related to payroll, employee benefits, retirement/401k, timekeeping, organizational structure, etc., are traditionally contained in "silos" that are separate from each other. Each of these silos is a different back end system. Currently, there is no front end system that can tie together these back end systems.

Each back end system is usually only accessed through specialized software and portals that require a computer and login. Without a single front end system, putting together information from these different back end silos for an individual employee requires considerable effort, both manually and systematically.

Most of the time these access points are physically removed from the context in which is useful. For example, if an employee has a question regarding his or her benefits, pay, available vacation time, etc., human resources specialists have to separately take time to research the situation and provide an answer at a later time.

In addition to the logistical inefficiencies of accessing the HR and payroll information, there are privacy and security issues with displaying private HR and payroll information on a traditional screen that might allow unauthorized persons to inadvertently see the information.

Therefore, it would be desirable to have a method and apparatus that take into account at least some of the issues discussed above, as well as other possible issues. For example, it would be desirable to have a method and apparatus that overcome the technical problems with accessing HR and payroll data across multiple back end systems and provide increased security and privacy in displaying such information.

SUMMARY

An embodiment of the present disclosure provides a method for retrieving and displaying data. A computer system identifies an employee in a live view on a mobile display system according to biometric data. The computer system identifies human resources (HR) information associated with the employee using the biometric data and a policy, wherein the HR information is stored in at least one database, and wherein the policy defines the HR information associated with the employee. The computer system displays the HR information associated with the employee in augmented reality information on the live view on the mobile display system.

Another embodiment of the present disclosure provides a human resources (HR) information processing system comprising a computer system and a HR information processor running on the computer system. The HR information processor identifies an employee in a live view on a mobile display system according to biometric data and identifies HR information associated with the employee using the biometric data and a policy. The HR information is stored in at least one database, and wherein the policy defines the HR information associated with the employee. Computer system displays the HR information associated with the employee in augmented reality information on the live view on the mobile display system.

Yet another embodiment of the present disclosure provides a computer program product for human resources (HR) information processing comprised of a computer-readable storage media; first program code, stored on the computer-readable storage media, for identifying an employee in a live view on a mobile display system according to biometric data; second program code, stored on the computer-readable storage media, for identifying human resources (HR) information associated with the employee using the biometric data and a policy, wherein the HR information is stored in at least one database, and wherein the policy defines the HR information associated with the employee; and third program code, stored on the computer-readable storage media, for displaying the HR information associated with the employee in augmented reality information on the live view on the mobile display system.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a method, an apparatus, a system, and a computer program product that accesses human resources and payroll information from multiple databases from a central access point and displays the retrieved data in a discreet manner. The illustrative embodiments also recognize and take into account that having human resources and payroll practitioners process requests for information often requires multiple access portals and queries on different back end systems, and human resources and payroll information is typically displayed on conventional screens that compromise security and privacy. The illustrative embodiments recognize and take into account that implementing a process that simplifies and streamlines retrieval of human resources and payroll information and improves the security and privacy of its method of display is desirable.

Thus, the illustrative embodiments provide a method, an apparatus, a system, and a computer program product for human resources (HR) information processing. A computer system identifies an employee in a live view on a mobile display system according to biometric data and identifies HR information associated with the employee using the biometric data and a policy. The HR information is stored in at least one database, and the policy defines the HR information associated with the employee. The computer system displays the HR information associated with the employee in augmented reality information on the live view on the mobile display system.

The computer system identifies a document in the live view on the mobile display system and performs optical character recognition on the document to identify content fields in the document. The computer system displays a relation of the HR information associated with the employee to any related content field in augmented reality information on the live view of the document on the mobile display system.

Figure 1:
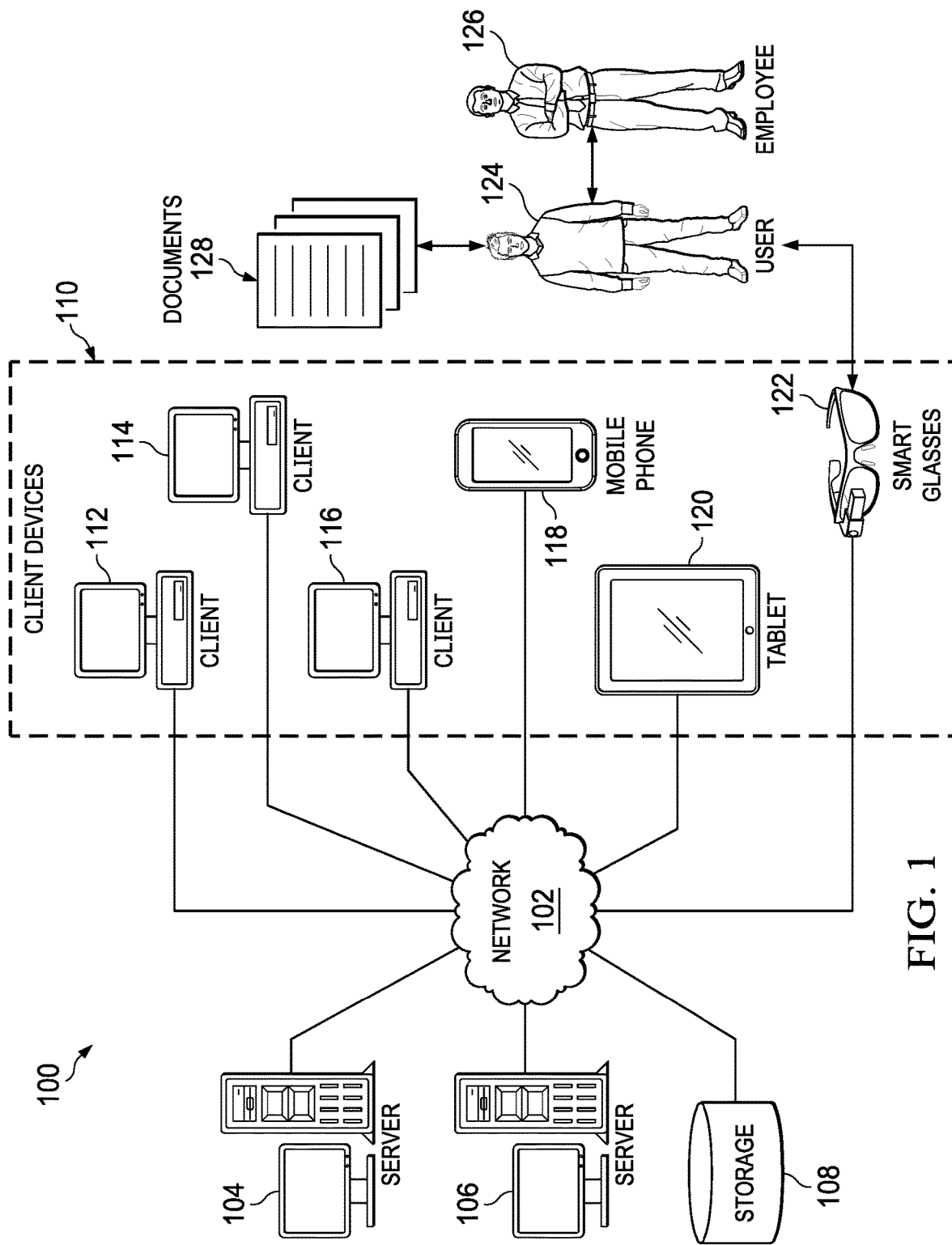
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, user 124 operates a mobile display system, such as smart glasses 122, to identify an employee for whom human resources and/or payroll information is requested. User 124 identifies the employee 126 using an augmented reality system through smart glasses 122. User 124 can also view a document 128, e.g., a calendar, using an augmented reality system through smart glasses 122 that overlays human resources information associated with the employee 126 on the document 128.

Figure 2:
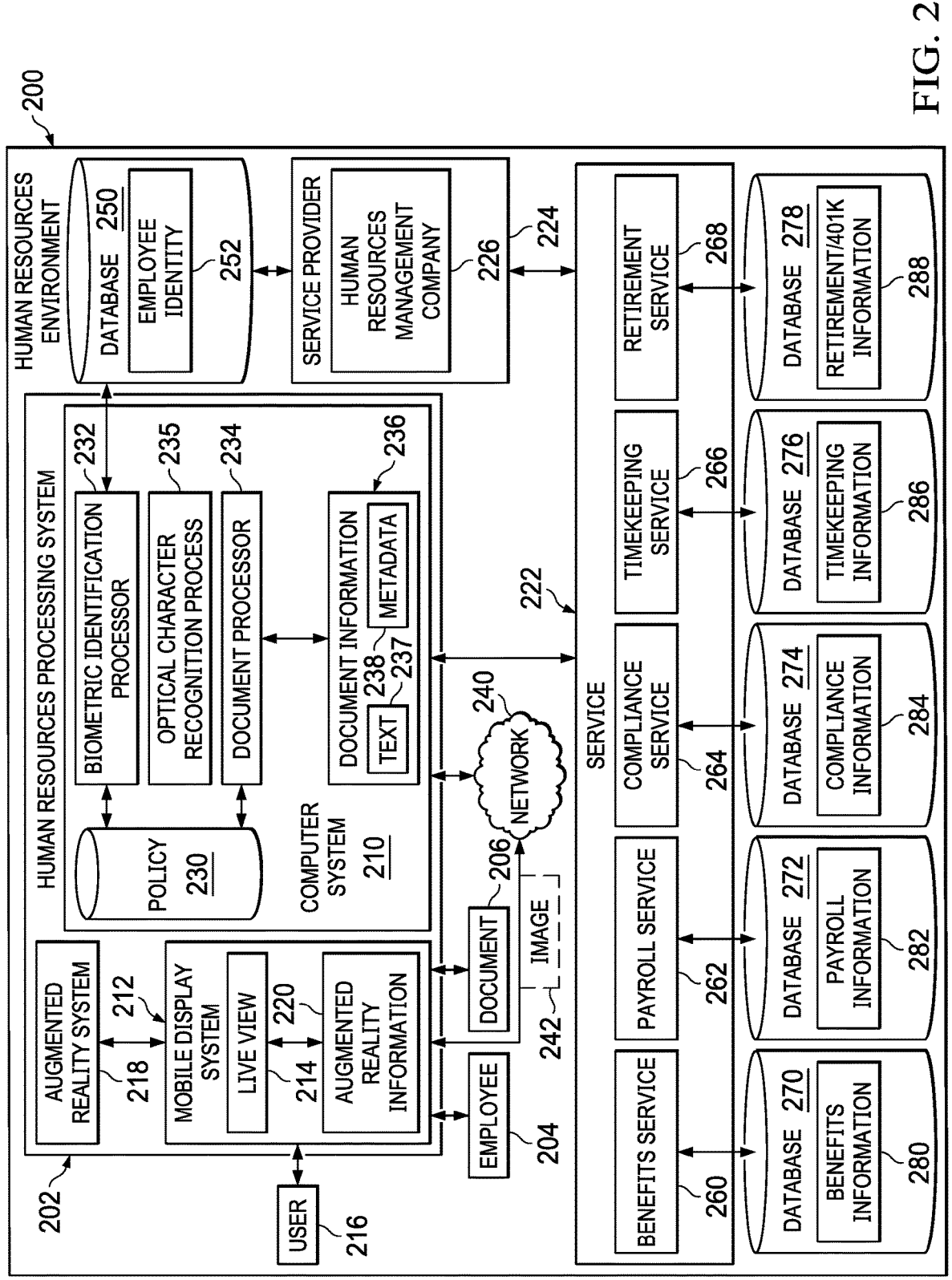
FIG. 2 is a block diagram of a human resources environment in accordance with an illustrative embodiment.

With reference next to FIG. 2, a block diagram of a human resources (HR) environment is depicted in accordance with an illustrative embodiment. In this example, HR environment 200 includes HR processing system 202 which operates to access, retrieve, and display HR and payroll information associated with employee 204.

As used herein, "a group of," when used with reference to items means one or more items. For example, "a group of document types" is one or more document types.

In this illustrative example, HR processing system 202 is a front end system that provides an integrative access point for the back end HR information silos. HR processing system 202 includes a number of different components. As depicted, HR processing system 202 includes biometric processor 244 and document processor 208 running on computer system 210, and mobile display system 212.

Biometric processor 244 and document processor 208 can be implemented in software, hardware, firmware, or a combination thereof. When software is used, the operations performed may be implemented in program code configured to run on hardware, such as a processor unit. When firmware is used, the operations performed may be implemented in program code and data and stored in persistent memory to run on a processor unit. When hardware is employed, the hardware may include circuits that operate to perform the operations in biometric processor 244 and document processor 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 210 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, mobile display system 212 is a hardware system and is configured to display live view 214 to user 216. User 216 is a human operator in these illustrative examples.

In this illustrative example, mobile display system 212 can function as augmented reality system 218 and display augmented reality information 220 on live view 214. In this illustrative example, mobile display system 212 is selected from one of smart glasses, a head-mounted display, a mobile phone, a tablet computer, wearable computer glasses, or some other suitable display system that can be moved and held or worn by user 216.

During operation, the components detect and process biometric parameters of an employee 204. These biometric parameters might comprise facial recognition, fingerprint, retinal scan, or any other biometric parameter known in the art, or a combination of such parameters.

The components of mobile display system 212 might also a process document 206 that is related to human resources information associated with the employee 204, e.g., calendar. The processing of document 206 includes at least one of sending metadata 226 about document 206, submitting document 206, sending text 237 from document 206, sending document information derived from document 206, or other actions with respect to document 206 to service 222 for service provider 224.

As depicted, service 222 can be human resources service provided by service provider 224 in the form of human resources management company 230. Service 222 can be selected from one of an employee benefits service 260, a payroll service 262, a compliance service 264, a timekeeping service 266, and a retirement planning service 268. Other human resources services (not shown) can include tax compliance, organization structure, recruitment, training, and other suitable functions relating to the management of employees. FIG. 2 illustrates how each of the HR services 260-268 has a separate associated database 270-272.

In this illustrative example, document 206 is related to one or more categories of human resources information 280-282. An example would be a calendar, which might relate to work time entered, scheduled vacation time, salary payment dates, scheduled training, etc.

As depicted, biometric identification processor 232 identifies employee 204 in the live view 214 on mobile display system 212. For example, mobile display system 212 can send image 242 over network 240 to biometric identification processor 232. This identification occurs by cross-referencing biometric data from the live view 214 with database 250 containing employee identity 252. This employee identification can take the form of an Employee Data Identifier linked to an index of validating metadata comprising the employee's name, social security number, biometric parameters, and other similar uniquely identifying information.

Similarly, document processor 234 running on computer system 210 identifies document 206 in live view 214 on mobile display system 212 for processing and performs optical character recognition (OCR) using optical character recognition process 235 on document 206 identified in live view 214 of document 206 on mobile display system 212 for user 216 to form document information 236 for document 206. As with the biometric information, mobile display system 212 can send image 242 over network 240 to document processor 234.

As depicted, document information 236 comprises text 237 derived from performing optical character recognition and may also comprise metadata 238 or other suitable types of information derived from document 206. Metadata 238 may include, for example, a date of document 206, a sender, a recipient, or other suitable information about document 206. From the document information 236, document processor can identify the type of document and relevant content fields in the document. For example, document processor 234 may determine that document 206 is a calendar and the date fields on that calendar.

The process identifies human resources information 280-288 associated with employee 204 using employee identity 252 and policy 230. If a document 206 is also captured in live view 214 the process identifies human resources information 280-288 related to the document using document information 236 and policy 240. Again using the example of a calendar for document 206, the process will identify information associated with employ 204 that would be relevant for display on a calendar such as, for example, payroll information (e.g., payment dates and amounts) and timekeeping information (e.g., hours worked or scheduled to work, scheduled time off). As another example, document 206 might be a health insurance claim form, in which case the process would identify benefits information 280 associated with the identified employee 204.

As depicted, human resources information 280-288 is stored across multiple databases 270-278. In this illustrative example, databases 270-278 are collections of data. Databases 270-278 may be relational databases containing a collection of schemas, tables, queries, reports, views, and other elements. Databases 270-278 can be accessed by a software application, such as a database management system. Service 222 may include the database management system. In other illustrative examples, other software, such as document processor 208, may directly access databases 270-278.

In the illustrative example, policy 230 defines human resources information 280-288 that is relevant to employee 204 and document 206. In other words, policy 230 can define what information is needed to find human resources information that corresponds to employee identity 252 and document information 236.

Further, document processor 234 displays a relation of human resources information 280-288 in databases 270-278 to document information 236 in augmented reality information 220 on live view 214 of employee 204 and document 206 on mobile display system 212. The relation of human resources information 280-288 to document information 236 in augmented reality information 220 may take a number of different forms.

For example, the relation may be displayed as a comparison between human resources information 280-288 and document information 236 using graphical indicators in augmented reality information 220. In another illustrative example, the relation may be displayed by highlighting parts of document 206. The highlighting indicates that a relation is present with human resources information 280-288. In this depicted example, the highlighting is a less specific way of showing the relation between human resources information 280-288 and document information 236 as compared to displaying a comparison.

Additionally, document processor 234 can send image 242 of document 206 generated by mobile display system 212 to service 222 that processes document 206 over network 240. Further, document processor 234 can send metadata 238 for document 206 with image 242 of document 206 to service 222 over network 240.

In one illustrative example, one or more technical solutions are present that overcome a technical problem with the time and expense involved with accessing human resources information 280-288 distributed across multiple databases 270-278 in separate silos in the back end systems. As a result, one or more technical solutions may provide a technical effect of at least one of increasing speed, reducing cost, or reducing errors in accessing human resources information through a single front end system that can communicate with the multiple back end systems.

As a result, computer system 210 operates as a special purpose computer system in which biometric identification processor 232 and document processor 234 in computer system 210 enables identification of employees and related documents more efficiently and at reduced cost. In particular, biometric identification processor 232 and document processor 234 transform computer system 210 into a special purpose computer system as compared to currently available general computer systems that do not have biometric identification processor 232 and document processor 234.

Figure 3:
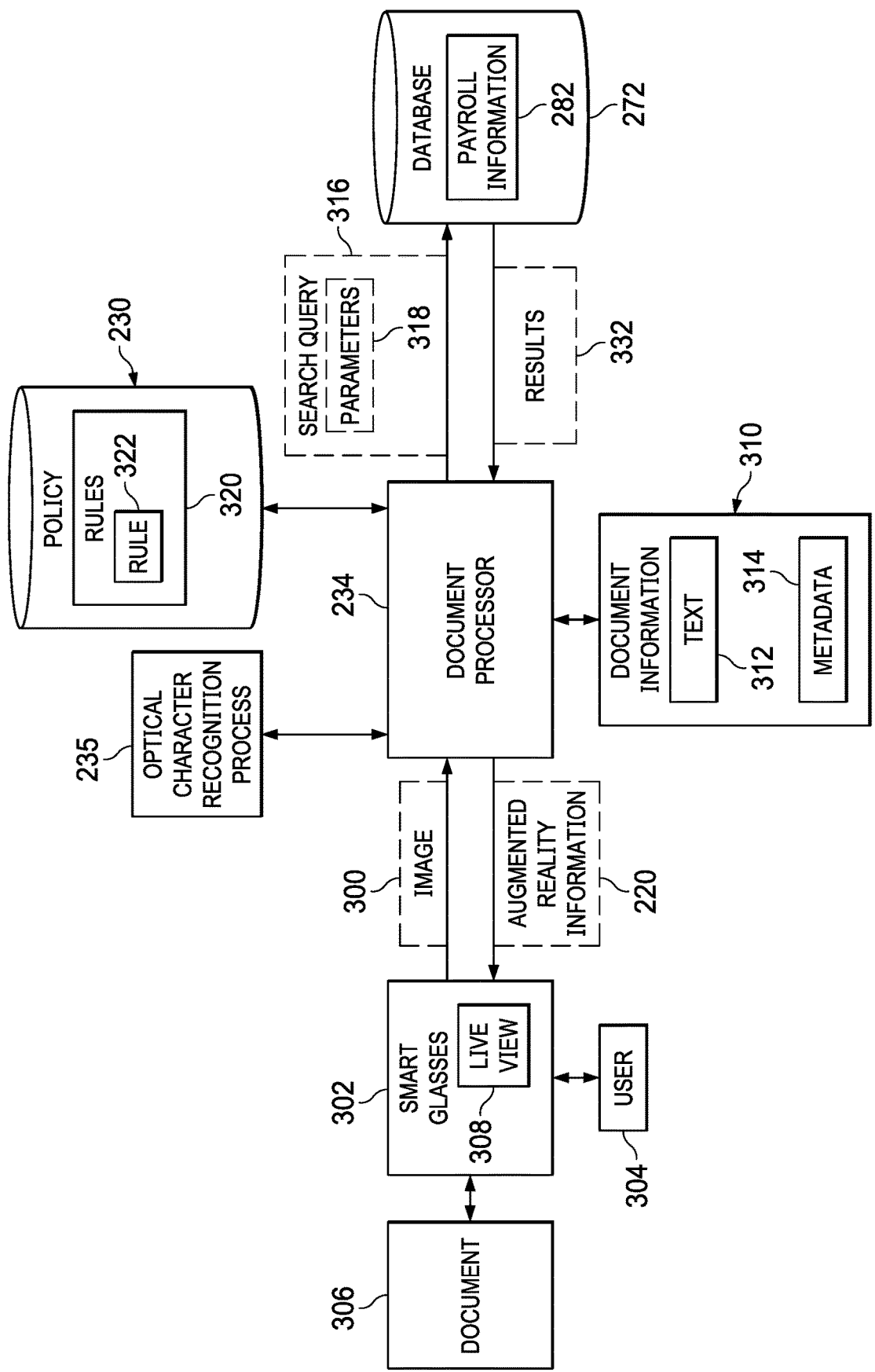
FIG. 3 is a diagram of a data flow for processing a document in accordance with an illustrative embodiment.

With reference now to FIG. 3, a diagram of a data flow for processing a document is depicted in accordance with an illustrative embodiment. In the illustrative examples, the same reference numeral may be used in more than one figure. This reuse of a reference numeral in different figures represents the same element in the different figures.

In this illustrative example, document processor 234 receives image 300 for processing on mobile display system 212 in FIG. 2 in the form of smart glasses 302. Image 300 is generated by user 304 viewing document 306 through live view 308 on smart glasses 302. For example, user 304 may review document 306 in live view 308 of smart glasses 302.

In the illustrative example, document processor 208 can automatically process document 306 as user 304 views document 306 in live view 308 on smart glasses 302. The processing of document 306 by document processor 208 reduces at least one of time or expense in submitting documents to service provider 224 in FIG. 2, such as human resources management company 226 in FIG. 2, for processing.

As depicted, document processor 234 generates document information 310. As depicted, document information 310 includes text 312 and metadata 314. Text 312 can be derived from performing optical character recognition on image 300 using optical character recognition process 235.

Metadata 314 for document 306 can be derived from at least one of image 300, text 312, or other suitable sources. For example, the type of document can be identified from text 312. Text 312 can be processed to identify the document type, date of the document, sender, recipient, and other information about document 306. This information is an example of information that may form metadata 314 in the depicted example. Metadata 314 also can include other information, such as the name of user 304 processing document 306, the location of user 304, or other suitable information.

This information can be derived from user 304 logging into an account or from being in communication with document processor 234. In some illustrative examples, smart glasses 302 may be logged into service 222 in FIG. 2.

Document processor 234 sends search query 316 to database 272 based on document information 310 and policy 230. In this example, database 272 contains payroll information 282 and may include software for performing queries. Queries to other databases might be sent concurrently with search query 316. Search query 316 is used to search for a match to parameters 318 in search query 316 as defined by rules 320 in policy 230. For example, rules 320 may be applied to document information 310 to generate search query 316. For example, text 312 and metadata 314 in document information 310 may contain information indicating that document 306 has a form that is a calendar.

Based on identifying the document type as a calendar, rule 322 for document type "calendar" is located in rules 320 in policy 230. In this example, rule 322 specifies that search query 316 should include parameters 318 comprising an employee name, an Employee Data Identifier, and a calendar.

Document processor 234 sends search query 316 based on rule 322. In response to search query 316, results 332 are returned from database 272. In this illustrative example, results 332 contain information from a record from database 272 for the employee that includes payment dates and amounts for the employee identified in search query 316 relevant to the time periods identified in the calendar in live view 308.

Using the results 332 received from the database 272, document processor 208 sends augmented reality information 220 to smart glasses 302 for display on live view 308 to user 304. Augmented reality information 220 augments live view 308 and can take a number of different forms.

For example, augmented reality information 220 may include a graphical indicator highlighting payment dates in view on the calendar and the payment amounts for those dates. Further, augmented reality information 220 also may graphically indicate the current tax withholding or other withdrawals from the payment (e.g., additional insurance for family members).

Figure 4:
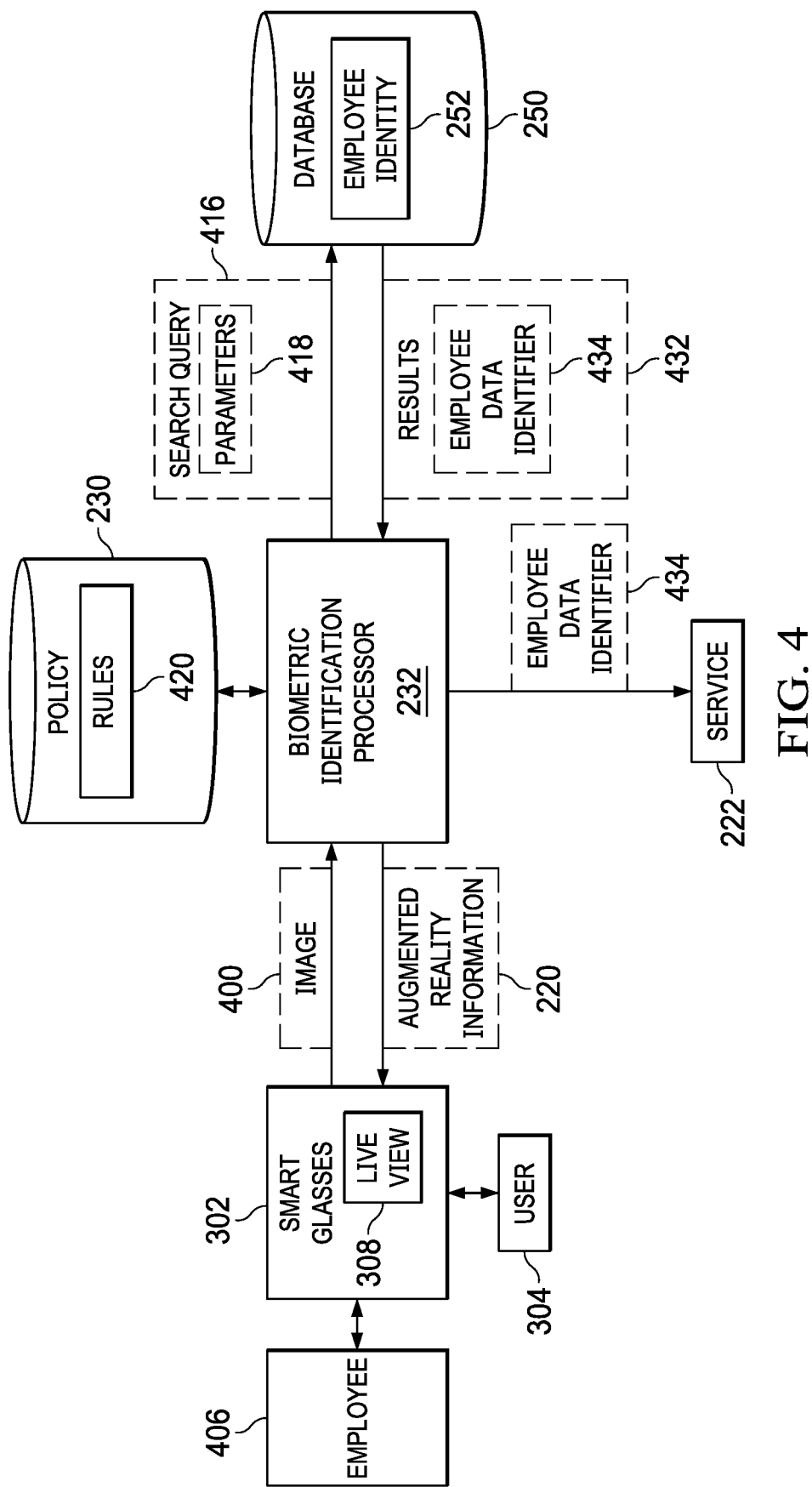
FIG. 4 is a diagram of a data flow for processing employee biometric data in accordance with an illustrative embodiment.

With reference now to FIG. 4, a diagram of a data flow for processing employee biometric data is depicted in accordance with an illustrative embodiment. In the illustrative examples, the same reference numeral may be used in more than one figure. This reuse of a reference numeral in different figures represents the same element in the different figures.

In this illustrative example, biometric identification processor 232 receives image 400 for processing on mobile display system 212 in FIG. 2 in the form of smart glasses 302. Image 400 is generated by user 304 viewing employee 406 through live view 308 on smart glasses 302. For example, user 304 may view employee 406 in live view 308 of smart glasses 302.

In the illustrative example, biometric identification processor 232 can automatically process biometric parameters of employee 406 as user 304 views employee 406 in live view 308 on smart glasses 302. The processing of employee 406 by biometric identification processor 232 increases the speed and security of verifying the identity of employees for service provider 224 in FIG. 2, such as human resources management company 226 in FIG. 2, for processing.

Biometric identification processor 232 sends search query 416 to database 250 based on detected biometric parameters and policy 230. Database 250 contains employee identify information 252 and may include software for performing queries. Search query 416 is used to search for a match to biometric parameters 418 in search query 416 as defined by rules 420 in policy 230. For example, rules 420 may be applied to facial recognition data to generate search query 416.

Biometric identification processor 232 sends search query 416 based on rule 420. In response to search query 416, results 432 are returned from database 250. In this illustrative example, results 432 contains a Employee Data Identifier 434 from a record from database 252 uniquely associated with the employee 406. In the illustrative example, the Employee Data Identifier 434 is a metadata parameter that is associated with identifying index information for the employee 406 in database 250 including employee name, social security number, biometric parameters and other uniquely identifying parameters known in the art.

Using the results 432 received from the database 250, biometric identification processor 232 sends augmented reality information 220 to smart glasses 302 for display on live view 308 to user 304. Augmented reality information 220 augments live view 308 and can take a number of different forms. For example, augmented reality information 220 may include a graphical indicator highlighting confirmation of employee identity in proximity to the employee 406 in live view 308.

In the illustrative example, the biometric identification processor 232 send the Employee Data Identifier 434 to human resources service 222. When files are processed and entered into the back end systems the relevant information in each human resources database for an individual employee is mapped to the index information associated with the Employee Data Identifier 434. The Employee Data Identifier 434 thereby ties together the different back end system silos so that when the biometric parameters are used as index credentials, the relevant information in the back end databases is unlocked for pertinent display in live view 308.

Biometric parameters and index credentials "log in" to the various databases all at once. The AR system determines which information from the various databases is relevant for the task at hand. Examples of input triggers to make this determination include the actual question from an employee to the HR practitioner, input from the HR practitioner, other physical items the HR practitioner uses for research (such as a calendar), or the specific designated expertise or role of the HR practitioner within the organization. For example, if the HR practitioner using the AR system is the Benefits Specialist, the system would know to unlock that data for display and be ready to provide data that is relevant and related from the other databases. As another example, if an employee has questions about deductions being taken from his or her pay due to health insurance, the HR practitioner can see related 401K deductions, which can affect the employee's pay but reside in another database.

The illustration of human resources environment 200 and the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more users with mobile display systems may be present in addition to or in place of user 216 with mobile display system 212. Further, biometric identification processor 232 and document processor 234 is shown as a separate functional block from service 222. In other illustrative examples, biometric identification processor 232 and document processor 234 can be a part of service 222 in other illustrative examples. Also, other databases may be present in addition to or in place of one or more of databases 270-278. Further, databases 270-278 may be used by another service in addition to or in place of service 222. Additionally, service 222 is run on a computer system, which may be the same or different computer system from computer system 210 in FIG. 2.

Figure 5:
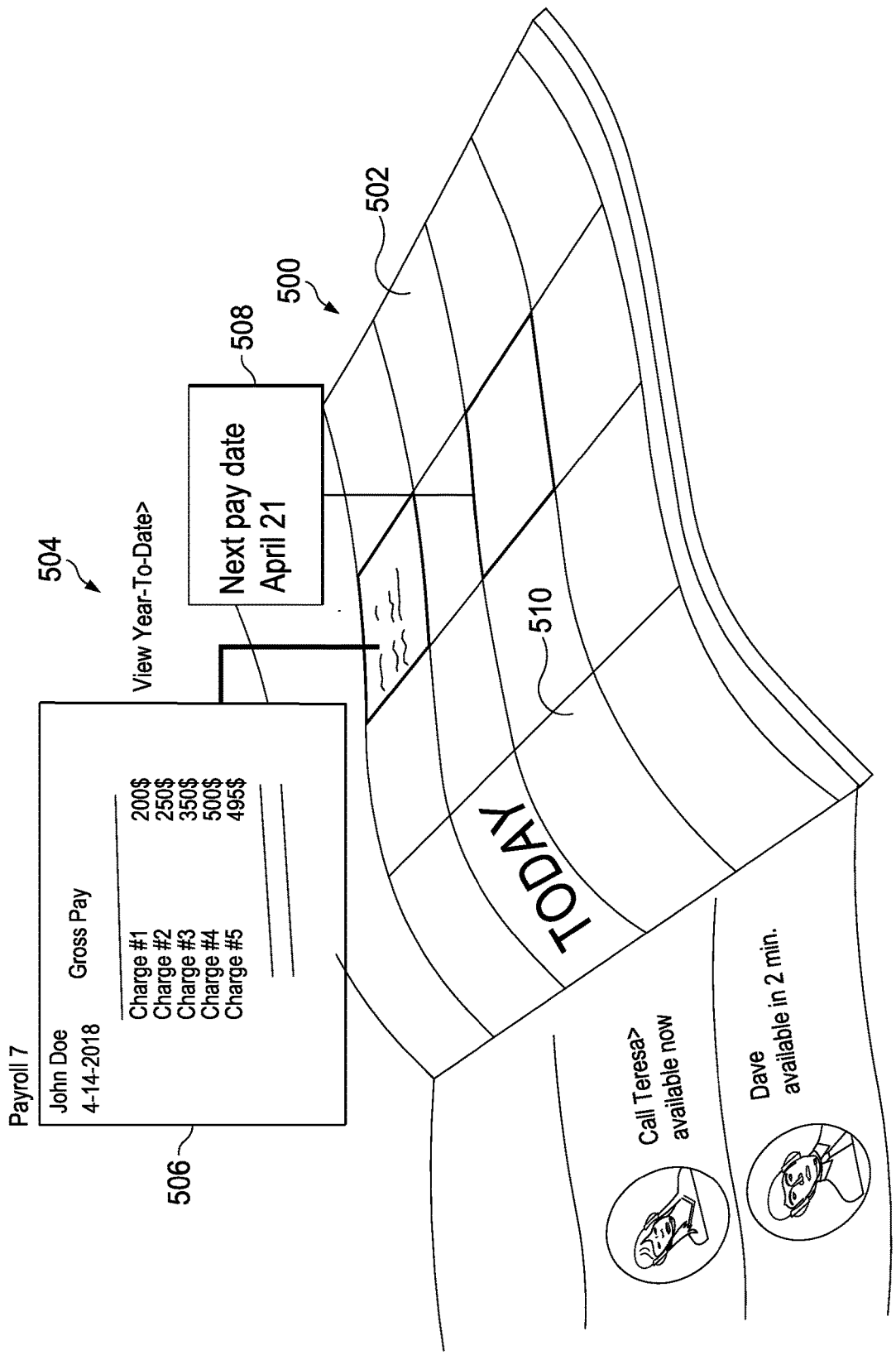
FIG. 5 is an illustration of a live view augmented by augmented reality information in accordance with an illustrative embodiment.

With reference next to FIG. 5, an illustration of a live view augmented by augmented reality information is depicted in accordance with an illustrative embodiment. In this illustrative example, live view 500 is an example of live view 214 in FIG. 2 or live view 308 in FIG. 3.

In this illustrative example, document 502 is a calendar seen in live view 500 by a user of a mobile display system on which live view 500 is seen. As depicted, augmented reality information 504 is displayed to augment live view 500. The display of augmented reality information 504 is generated in response to processing an image of document 502. The image of document 502 is sent from the mobile display system to a document processor, such as document processor 234 in FIGS. 2-3.

In the illustrative example, graphical indicators 506 and 508 in augmented reality information 504 identify past and upcoming payment dates for the time period visible on calendar 502 within the live view 500. Graphical indicator 506 identifies the most recent pay date and may include additional information such as wages paid year-to-date, withholdings, etc. Graphical indicator 508 indicates the next scheduled pay date. Graphical indicator 510 highlights the present day on which document 502 is being viewed.

The illustration of augmented reality information 504 displayed on live view 500 of document 502 is provided as an example of one manner in which augmented reality information 220 can be displayed on live view 214 shown in block form in FIG. 2. This example is not meant to limit the manner in which augmented reality information can be displayed on live views of documents in other illustrative examples. For example, other illustrative examples may display augmented reality information in the form of a video on a live view to provide instructions or selections for user input.

Figure 6:
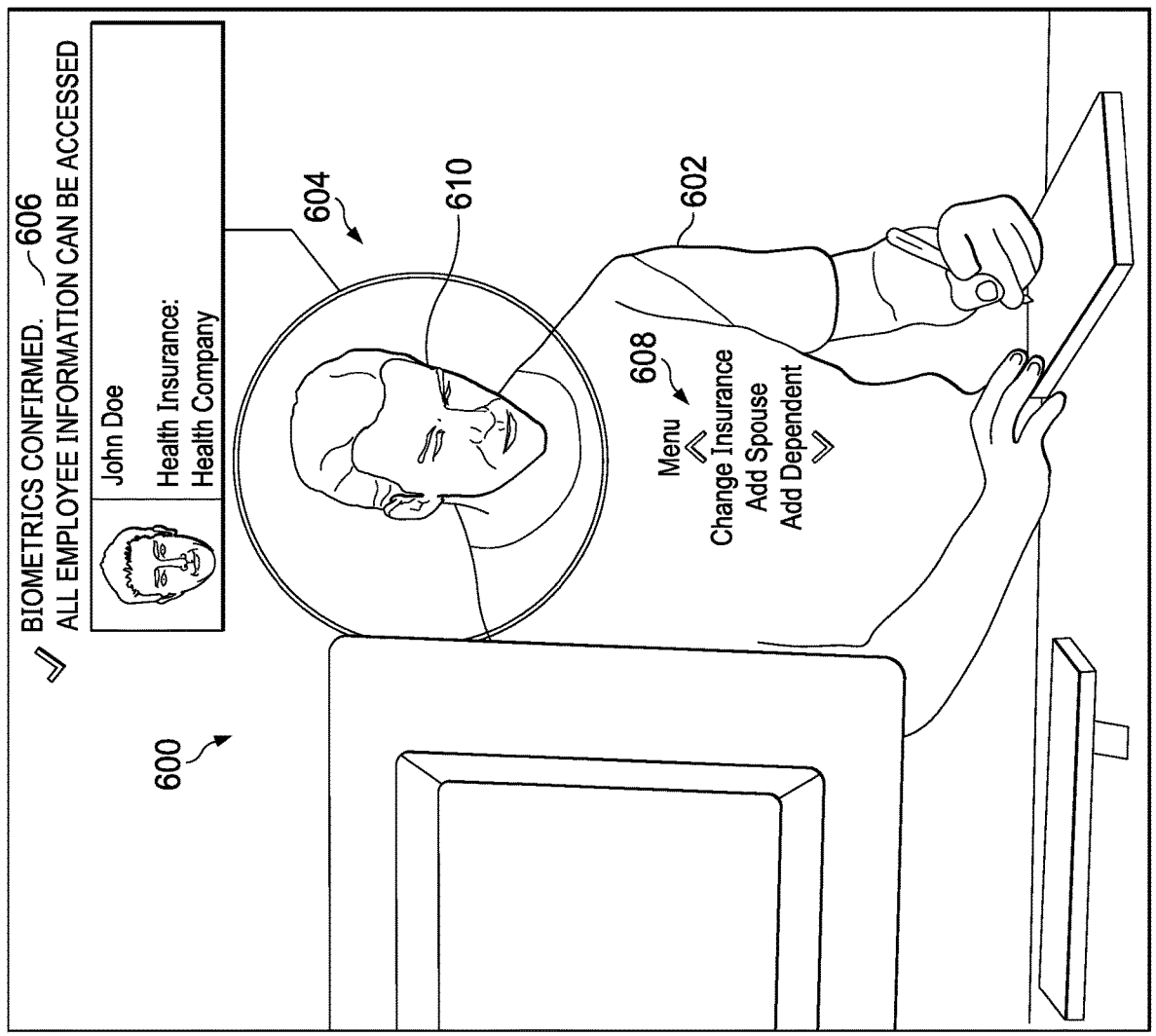
FIG. 6 is an illustration of a live view augmented by augmented reality information based on biometric identification in accordance with an illustrative embodiment.

With reference next to FIG. 6, an illustration of a live view augmented by augmented reality information based on biometric identification is depicted in accordance with an illustrative embodiment. In this illustrative example, live view 600 is an example of live view 214 in FIG. 2 or live view 308 in FIG. 4.

In this illustrative example, an employee 602 is seen in live view 600 by a user of a mobile display system on which live view 600 is seen. As depicted, augmented reality information 604 is displayed to augment live view 600. The display of augmented reality information 604 is generated in response to processing an image of employee 602. The image of employee 602 is sent from the mobile display system to a processor, such as biometric identification processor 232 in FIG. 2.

In the illustrative example, graphical indicator 610 in augmented reality information 604 highlights a facial recognition scan being performed on employee 602. Graphical indicator 606 in augmented reality information 604 confirms the identity of employee 602 visible within the live view 600. In the present example, the human resources information relates to health insurance. Therefore, in addition to displaying biometric confirmation of the identity of employee 602, graphical indicator 606 also displays information about the employee's health insurance plan. Graphical indicator 608 presents a menu from which the user of the mobile display system may select options related to the health insurance plan of the identified employee 602, for example, adding a spouse to the plan, adding a dependent, changing insurance carriers, etc.

It should be emphasized that the types of live views depicted in the illustrative examples shown in FIGS. 5 and 6 can be combined in a single live view. For example, the user of the mobile display system might have both employee 602 and document 502 in view. After biometric confirmation of the employee's identity, the augmented reality information would include graphical indicators displayed on the document as well as superimposed on the employee. The type of graphical indicators will depend on the type of human resources information being requested by the user of the mobile display system. For example, the employee might inquire about scheduled and/or remaining vacation time, which would then be displayed on a calendar after confirmation of the employee's identity, along with a menu with options regarding scheduling/rescheduling vacation time.

Figure 7:
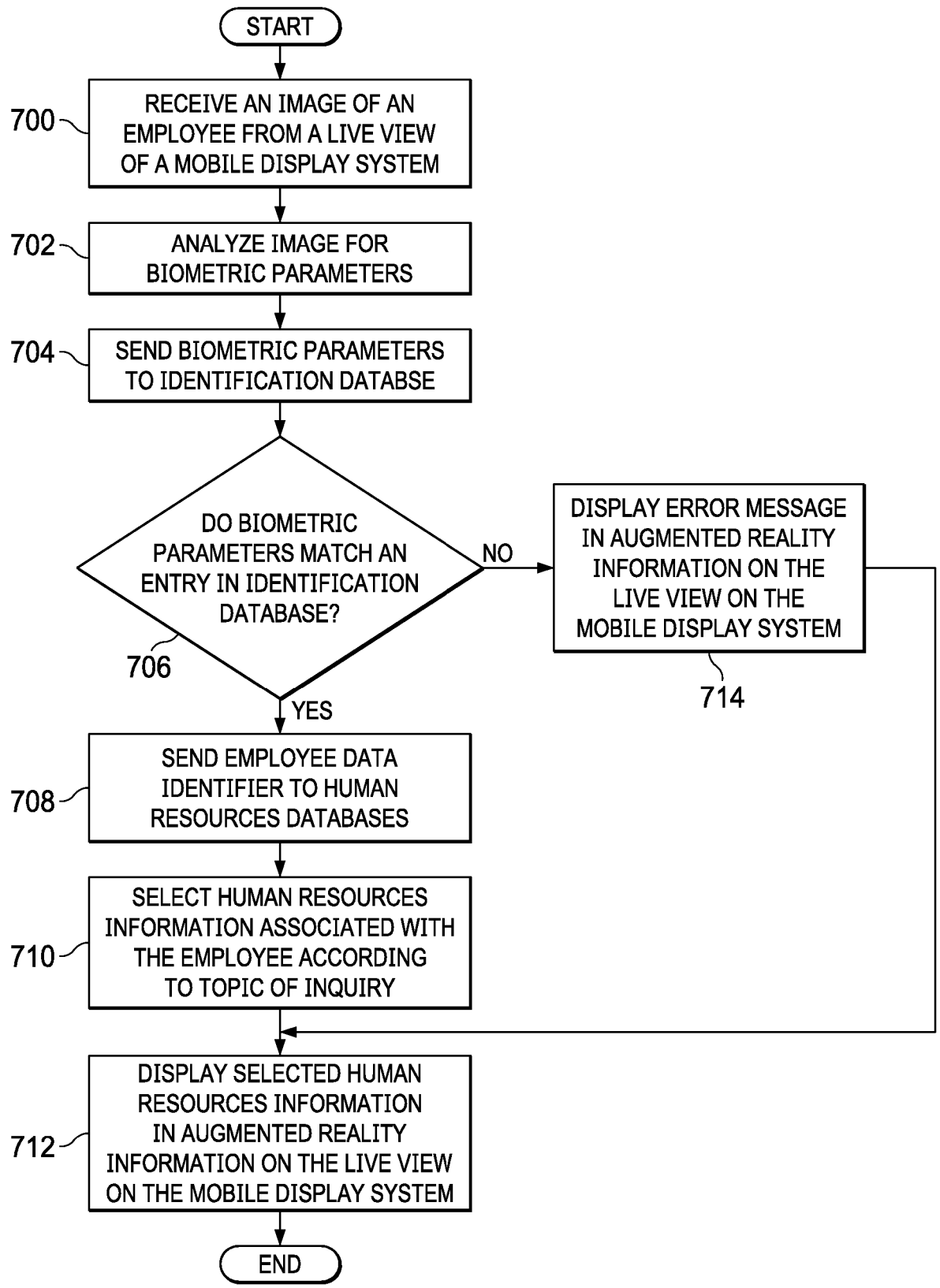
FIG. 7 is a flowchart of a high-level process for processing biometric data in accordance with an illustrative embodiment.

With reference to FIG. 7, a flowchart of a high-level process for processing biometric data is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in document processor 208 running on computer system 210 in FIG. 2.

The process begins by receiving an image of an employee from a live view of a mobile display system (step 700). The employee can be identified in step 700 in a number of ways. For example, object recognition process can be performed on an image to determine when a person is present in the live view.

The process analyzes the image of the employee for biometric parameters (step 702). In an illustrative example, the system performs facial recognition identification when a person is present in the live view. Alternative examples include fingerprint identification and retinal scan. The principles of operation of the present invention can be applied to any biometric identification method.

The biometric parameters are sent to an identification database that contains cross-referenced index information for all employees in the system (step 704).

The biometric data is compared to the entries in the identification database to determine if there is a match (step 706). If the biometric parameters do not match any entry in the identification database, and error message is displayed in augmented reality information on the live view to a user of the mobile display system (step 714). The process terminates thereafter.

If the biometric parameters do match an entry in the identification database, the Employee Data Identifier associated with the employee's index information is sent to the human resources databases (step 708).

Human resources information associated with the employee in the respective human resources databases is selected according to the topic of the inquiry (step 710). For example, if the inquiry is related to payroll, or the HR practitioner is a payroll specialist, information related to payroll either directly or indirectly (e.g., health insurance deductions) would be selected according to policy 230. The selected information is then displayed on the live view to the user of the mobile display system (step 712).

Figure 8:
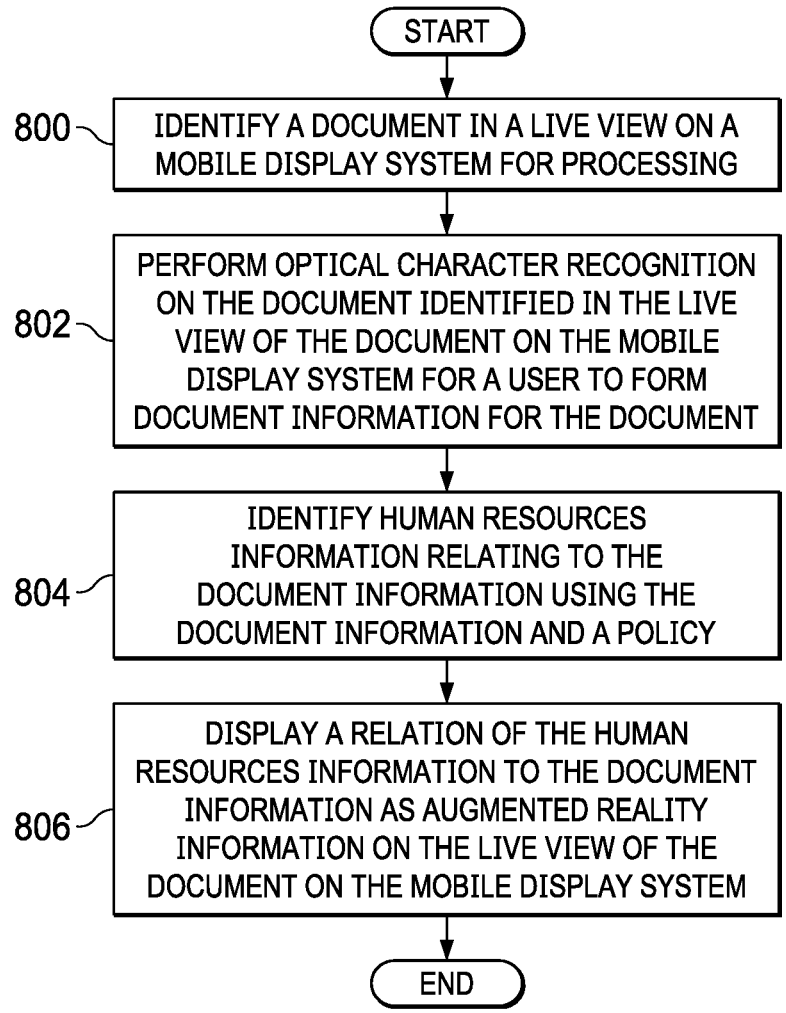
FIG. 8 is a flowchart of a process for processing a document in accordance with an illustrative embodiment.

Turning next to FIG. 8, a flowchart of a process for processing a document is depicted in accordance with an illustrative embodiment. The processes in FIG. 8 can be implemented in hardware, software, or both. When implemented in software, the processes can take the form of program code that is run by one of more processor units located in one or more hardware devices in one or more computer systems. For example, these processes can be implemented in document processor 234 running on computer system 210 in FIG. 2.

The process begins by identifying a document in a live view on a mobile display system for processing (step 700). The process performs optical character recognition on the document identified in the live view of the document on the mobile display system and determines content fields within the document (step 802).

The process identifies human resources information relating to the document information using the document information and a policy (step 804). The human resources information is stored in one or more databases in the back end systems, and the policy comprises one or more rules that associate human resources information to an identified employee and define what human resources information associated with that employee is relevant to the document.

The process displays a relation of the human resources information to related content fields in the document information as augmented reality information on the live view of the document on the mobile display system (step 806). In step 806, content fields of the document containing document information of interest can be highlighted.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
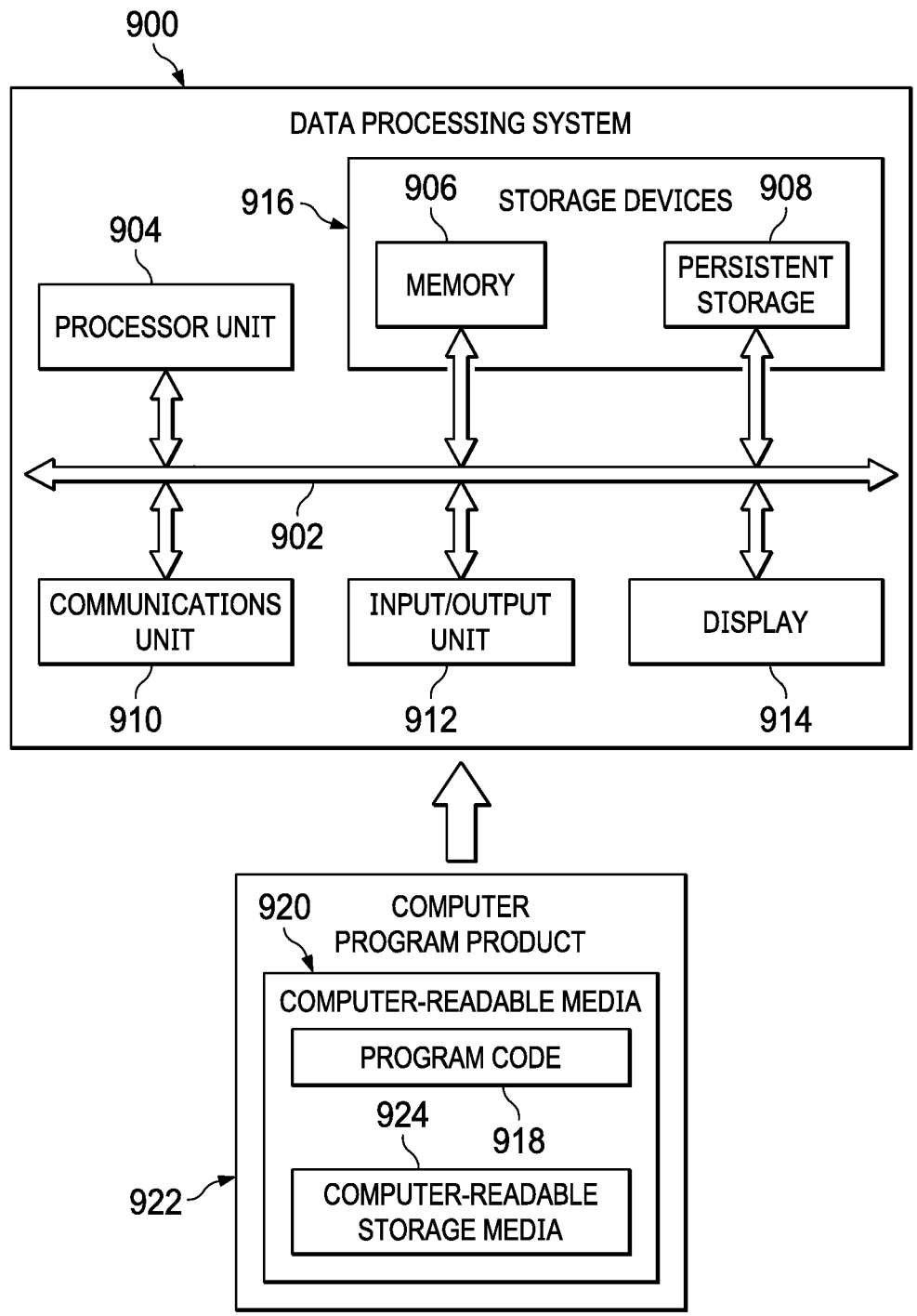
FIG. 9 is a block diagram of a data processing system in accordance with an illustrative embodiment.

Turning now to FIG. 9, a block diagram of a data processing system is depicted in accordance with an illustrative embodiment. Data processing system 900 may be used to implement server computer 104 in FIG. 1, server computer 106 in FIG. 1, client devices 110 in FIG. 1, computer system 210 in FIG. 2, mobile display system 212 in FIG. 2, and smart glasses 302 in FIG. 3. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random-access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a solid-state drive (SSD), a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 may be transferred to data processing system 900 using a computer-readable signal media. The computer-readable signal media may be, for example, a propagated data signal containing program code 918. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Thus, the illustrative examples provide a method, an apparatus, a system, and a computer program product for document processing. In one illustrative example, a computer system identifies a document in a live view on a mobile display system for processing. The document contains changes that may affect human resources information managed by a service provider through a service. Based on analyzing the document, human resources information may need to be changed to maintain accuracy of the human resources information.

The computer system performs optical character recognition on the document identified in the live view of the document on the mobile display system for a human operator to form document information for the document. The computer system identifies human resources information relating to the document information using the document information and a policy. The human resources information is stored in a database, wherein the policy defines the human resources information relevant to the document. The computer system displays a relation of the human resources information to the document information in augmented reality information on the live view of the document on the mobile display system to augment the live view. If the document has already been processed, the computer system updates the human resources information in the database using the document information to form updated human resources information.

In one illustrative example, one or more technical solutions are present that overcome a technical problem with the time and expense involved with submitting documents to a human resources management company for processing. As a result, one or more technical solutions may provide a technical effect of at least one of increasing speed, reducing cost, or reducing errors in processing of documents. One or more technical solutions are presented in which a user of a mobile display system views one or more of the documents in the live view on a mobile display system. A document processor processes the documents with respect to a service provider.

In one or more technical solutions, the document processor displays augmented reality information to notify the user of processing of a document, request user input from the user, or some combination thereof. The notification can include indicating whether the document has already been processed or that the processing of the document has been completed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for retrieving data, the method comprising: a mobile display system generating an image of a live view of an employee and of a document; identifying an employee data identifier in a first database communicating with a computer system using first rules in a policy, via the computer system receiving the image from the live view on the mobile display system and using a biometric parameter in the live view of the employee; displaying, in an augmented reality overlay in the live view, a confirmation of identifying the employee data identifier; determining, by the computer system using the live view of the document, content fields within the document and a type of document; concurrently retrieving, using the employee data identifier and second rules in the policy for the type of document, human resources (HR) information, mapped to the employee data identifier and relevant to the document, stored in a database distinct from the first database such that the policy defines the HR information associated with the employee; and displaying, by the computer system, a relation of the HR information associated with the employee to the document in augmented reality information overlaid on the live view on the mobile display system.

2. The method of claim 1 further comprising:
performing, by the computer system, optical character recognition on the document in the live view on the mobile display system and identifying at least one content field of the content fields in the document; and
displaying, by the computer system, a comparison of the HR information associated with the employee to any related content field in the augmented reality information overlaid on the live view of the document on the mobile display system.

3. The method of claim 1, wherein the HR information is stored in a plurality of databases.

4. The method of claim 1, further comprising:
retrieving the HR information from a server storing multiple databases.

5. The method of claim 1, further comprising:
cross-referencing, by the computer system, the HR information with validating metadata associated with the employee data identifier.

6. The method of claim 5, wherein the validating metadata comprises a combination selected from a group comprising employee name, biometric data, social security number, and employee identification number.

7. The method of claim 1, wherein the HR information is selected from a group comprising pay, employee benefits including insurance and retirement, available vacation and scheduled time-off.

8. The method of claim 1, wherein the biometric parameter comprises one of: facial recognition, fingerprint, and retinal scan.

9. The method of claim 1, wherein the mobile display system is selected from one of a head-mounted display, a mobile phone, a tablet computer, smart glasses, and wearable computer glasses.

10. A human resources (HR) information processing system that comprises:
a computer system that comprises a HR information processor configured to:
receive images, from a live view on a mobile display system, of an employee and a document;
identify, based upon first rules in a policy in the HR information processor and a biometric parameter in the live view of the employee, an employee data identifier in a first database configured to communicate with the computer system;
display, in an augmented reality overlay in the live view, a confirmation of an identification of the employee data identifier;
determine, based upon the live view of the document, content fields within the document and a type of document;
concurrently retrieve, based upon the employee data identifier and second rules in the policy for the type of document, HR information associated with the employee and relevant to the document, wherein the HR information is stored in at least one database distinct from the first database, and wherein such that the policy defines the HR information associated with the employee; and display a relation of the HR information associated with the employee to the document in augmented reality information overlaid on the live view on the mobile display system.

11. The HR information processing system of claim 10, further comprising the HR information processor configured to:
  perform optical character recognition on the document in the live view on the mobile display system and identify at least one content field of the content fields in the document; and
  display a relation of the HR information associated with the employee to any related content field in the augmented reality information on the live view of the document on the mobile display system.

12. The HR information processing system of claim 10, wherein the HR information is stored in a plurality of databases.

13. The HR information processing system of claim 10, wherein in identifying the HR information associated with the employee, the HR information processor cross-references the HR information from a biometric file associated with the employee in the live view.

14. The HR information processing system of claim 10, wherein in identifying the HR information associated with the employee the HR information processor cross-references the HR information with validating metadata associated with the employee in the live view.

15. The HR information processing system of claim 14, wherein the validating metadata comprises a combination selected from a group comprising employee name, biometric data, social security number, and employee identification number.

16. The HR information processing system of claim 10, wherein the HR information is selected from a group comprising pay, employee benefits including insurance and retirement, available vacation and scheduled time-off.

17. The HR information processing system of claim 10, wherein the biometric parameter comprises one of: facial recognition, fingerprint, and retinal scan.

18. The HR information processing system of claim 10, wherein the mobile display system is selected from one of a head-mounted display, a mobile phone, a tablet computer, smart glasses, and wearable computer glasses.

19. A computer program product configured to process human resources (HR) information, such that the computer program product comprises:
  a computer-readable storage media in an HR information processor;
  first program code, stored on the computer-readable storage media and configured to:
    receive images, from a live view on a mobile display system, of an employee and a document;
    identify, based upon first rules in a policy in the HR information processor and a biometric parameter in the live view of the employee, an employee data identifier in a first database configured to communicate with the HR information processor a document and a biometric parameter of an employee in a live view on the mobile display system;
    display, in an augmented reality overlay in the live view, a confirmation of an identification of the employee data identifier; and
    determine, based upon the live view of the document, content fields within the document and a type of document;
  second program code, stored on the computer-readable storage media and configured to concurrently retrieve, based upon the employee data identifier and second rules in the policy for the type of document, the HR information associated with the employee, wherein the HR information is stored in at least one database distinct from the first database, such that the policy defines the HR information associated with the employee; and
  third program code, stored on the computer-readable storage media and configured to display a relation of the HR information associated with the employee in augmented reality information overlaid on the live view on the mobile display system.

20. The computer program product of claim 19, further comprising:
  fourth program code, stored on the computer-readable storage media and configured to perform optical character recognition on the document in the live view on the mobile display system and identify at least one content field of the content fields in the document; and
  fifth program code, stored on the computer-readable storage media and configured to display a relation of the HR information associated with the employee to any related content field in the augmented reality information on the live view of the document on the mobile display system.

* * * * *